US008395719B2

(12) United States Patent
Chen et al.

(10) Patent No.: US 8,395,719 B2
(45) Date of Patent: Mar. 12, 2013

(54) DISPLAY DEVICE AND LIGHT SOURCE BLOCK USED THEREIN

(75) Inventors: Chien-Hyung Chen, Hsin-Chu (TW); Ching-Kun Lai, Hsin-Chu (TW); Wen-Hsin Lin, Hsin-Chu (TW); Wei-Chih Chiu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 762 days.

(21) Appl. No.: 12/493,369

(22) Filed: Jun. 29, 2009

(65) Prior Publication Data

US 2010/0039580 A1    Feb. 18, 2010

(30) Foreign Application Priority Data

Aug. 15, 2008 (TW) ................. 97131300 A (51) Int. Cl.
G02F 1/1333 (2006.01)
G02F 1/1335 (2006.01)
(52) U.S. Cl. ............................ 349/58; 349/67
(58) Field of Classification Search .......... 349/67, 349/58
See application file for complete search history.

(56) References Cited

U.S. PATENT DOCUMENTS

| 6,867,825 | B2 | 3/2005 | Kanatsu et al. |
| 7,030,943 | B2 | 4/2006 | Kao |
| 2004/0114372 | A1* | 6/2004 | Han et al. ............. 362/330 |
| 2004/0257501 | A1* | 12/2004 | Kim et al. ............. 349/110 |

FOREIGN PATENT DOCUMENTS

| CN | 1945013 | 11/2004 |
| CN | 1873495 | 12/2006 |
| CN | 1991237 | 7/2007 |
| CN | 101067693 | 11/2007 |
| CN | 101071234 A | 11/2007 |

OTHER PUBLICATIONS

Chinese language office action dated Aug. 21, 2009.
English language translation of abstract and pertinent parts of CN 101067693 (Published Nov. 7, 2007).
English language translation of abstract of CN CN1873495 (Published Dec. 6, 2006).
Chinese language office action dated Dec. 11, 2009.
English language translation of CN 1945013 (published Nov. 11, 2004).
Chinese language Office Action dated Jun. 12, 2010.
English translation of specification and abstract of CN101071234A.
Taiwanese language office action dated Apr. 23, 2012.
English language translation of abstract of CN 1991237 (published Jul. 4, 2007).

* cited by examiner

Primary Examiner — Wen-Ying P Chen
(74) Attorney, Agent, or Firm — McClure, Qualey & Rodack, LLP (57) ABSTRACT

A display device and a light source block used therein are provided. The display device includes the light source block, a film set, and a display panel. The light source block has a reflective surface, a film supporter intersecting the reflective surface at an edge, and a panel supporting surface. The film supporter connects an end of an extremity surface, and the panel supporting surface connects the other end of the extremity surface. The film set is disposed on the film supporter, and the display panel is disposed on the panel supporting surface. The display panel has a display area and a light-shielding unit disposed outside the display area. The edge between the reflective surface and the film supporter falls into a vertical projection of the light-shielding unit.

19 Claims, 6 Drawing Sheets

DISPLAY DEVICE AND LIGHT SOURCE BLOCK USED THEREIN

This application claims the priority based on a Taiwanese Patent Application No. 097131300, filed on Aug. 15, 2008, the disclosure of which is incorporated herein by reference in its entirety.

BACKGROUND OF THE INVENTION

1. Field of the Invention

The present invention generally relates to a display device and a light source block used therein. Particularly, the present invention relates to a display device and a light source block used therein for preventing bright bands from occurring at the edge (also called a bright band effect). More particularly, the present invention relates to a liquid crystal display device and a light source block used therein for preventing the bright band effect at the edge.

2. Description of the Prior Art

Because liquid crystal display panels (LCD panels) are characterized by thin, light, convenient, and low radiation compared to CRT display devices, the demand for LCD panels has increased largely. Particularly, a backlight module is one of essential components in the LCD panel. With the advance of the manufacturing technology in LCD panels, the backlight module has become thinner, lighter, brighter, and cost lower. In order to maintain the competitive advantage of LCD panels, developing a high quality backlight module is an important issue.

Figure 1:
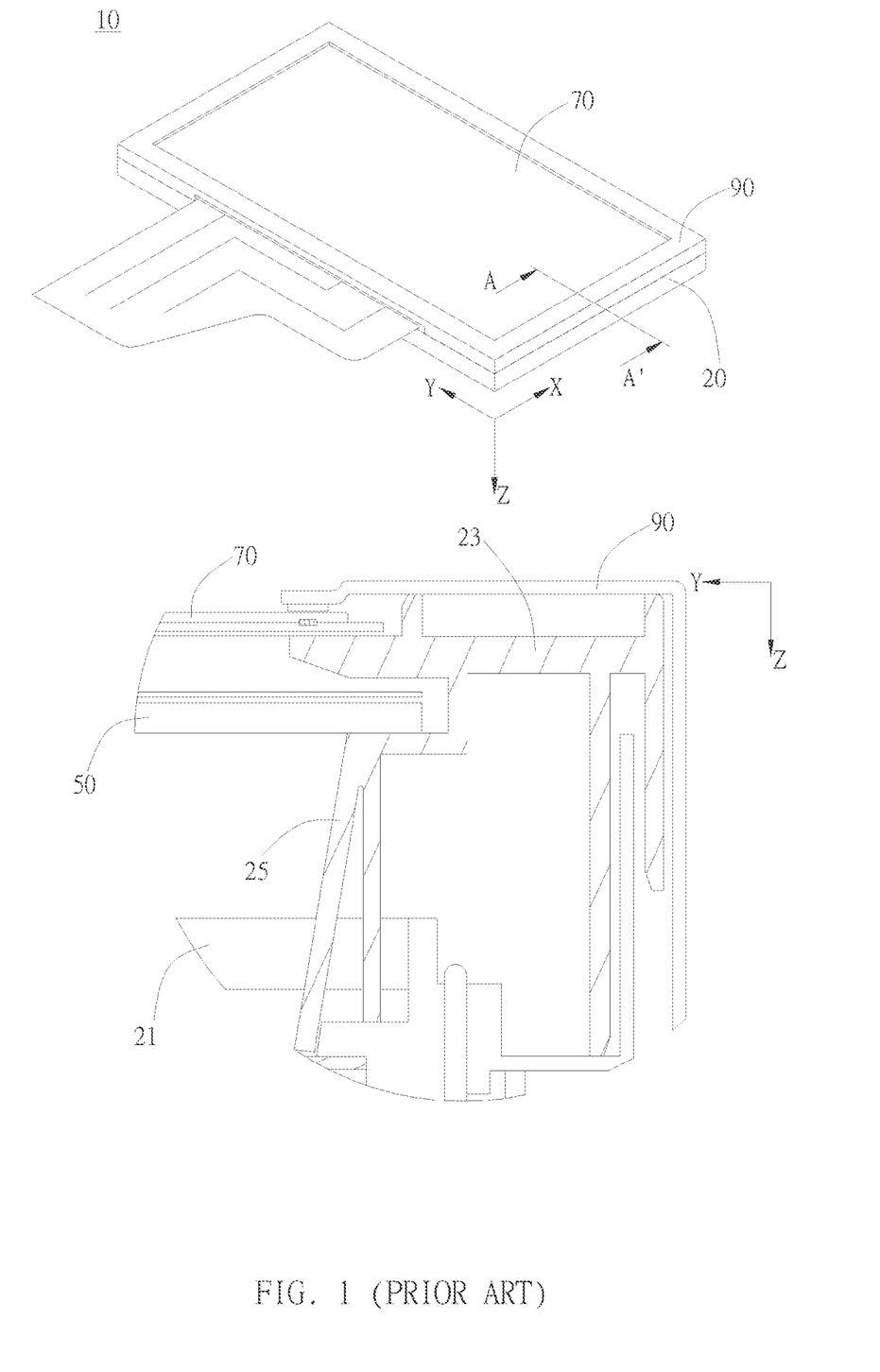
FIG. 1 shows a schematic view of a conventional liquid crystal display device.

FIG. 1 is a schematic view of a conventional LCD device. As shown in FIG. 1, a LCD device 10 includes a backlight module 20, a liquid crystal panel 70 disposed on the backlight module 20, and a front frame 90. For the backlight module 20 using lamps as a light source, the backlight module 20 includes a lamp 21, a lamp block 23, and optical films 50. One of the conventional lamp blocks is designed in a form of two pieces including a lamp holder and a frame. Since the two-piece design will increase the cost of molds and productions, the two-piece design is currently replaced with the one-piece design shown in FIG. 1, which integrates the lamp holder and the frame into one piece as an integral lamp block.

With reference to FIG. 1, the lamp block 23 has a reflective surface 25 at the inner lower rim for reflecting the light generated from the lamp 21 so as to increase light usability or brightness. When the lamp block 23 is formed in one piece, the body of the lamp block 23 is conventionally injection-molded by black material, and then, a reflective material is attached to the body as the reflective surface 25. Alternatively, a dual color injection molding process can be adapted to form the reflective surface 25 with white material and the body of the lamp block 23 with black material. However, the above-mentioned technique is higher cost and time consuming. Accordingly, improvements are still required. In the case of directly using white material for injection-molding the lamp block 23, any further process for the reflective surface 25 is not required. However, when the lamp block 23 of white material supports the optical film 50, excessive reflections will occur at the edge of the optical film 50, resulting in bright bands at the edge of the liquid crystal panel 70.

SUMMARY OF THE INVENTION

It is an object of the present invention to provide a display device and a light source block used therein for preventing bright bands from occurring at the edge of a display area.

It is another object of the present invention to provide a display device and a light source block used therein to reduce the production cost.

It is a further object of the present invention to provide a display device and a light source block used therein to reduce the production time and to simplify the manufacturing processes.

The display device includes a display panel and a backlight module. The display panel is disposed on a light output side of the backlight module to receive the light from the backlight module so as to generate images. The backlight module includes a light source module, a light source block, and a film set. The light source block includes a reflective surface, a film supporter, and a panel supporting surface. The reflective surface is provided at a lower portion of the light source block and faces the light source module so as to reflect the light from the light source module. A side of the reflective surface intersects a side of the film supporter with an included angle therebetween to form an edge. The film supporter connects an end of an extremity surface. The panel supporting surface connects the other end of the extremity surface and is disposed above the film supporter.

The film set is disposed above the light source module for adjusting the light generated from the light source module. The film set is disposed on the film supporter. The film supporter supports the edge of the film set. The film supporter provides a required supporting force for the film set so as to position the film set in an appropriate position of the backlight module. The display panel is disposed on the panel supporting surface. The panel supporting surface supports the edge of the display panel to provide a required supporting force for the display panel so as to position the display panel in an appropriate position of the display device. The display panel includes a display area and a light-shielding unit. When the light generated from the light source module enters the display panel, by controlling the liquid crystal layer, images can be generated on the display panel. The light-shielding unit is disposed outside the display area. Viewing the display panel from a direction perpendicular to the display panel, the intersected edge between the reflective surface and the film supporter falls into the vertical projection of the light-shielding unit. By such a design, the light reflected from the reflective surface to the edge of the film set will be reduced. Consequently, coupling with the light reflected from the film supporter, the light close to the light source block can be uniformly distributed to prevent bright bands from occurring at the edge of the display panel.

DETAILED DESCRIPTION OF THE PREFERRED EMBODIMENT

The present invention provides a display device and a light source block used therein. In an embodiment, the display device in the present invention includes, but is not limited to, a liquid crystal display (LCD) device; however, in other embodiments, the display device can include other display device which uses a backlight module or a light source. The LCD device can be any display device having a liquid crystal panel, home television, or liquid crystal monitors of personal computers, laptops, mobile phones, and digital cameras.

Figure 2:
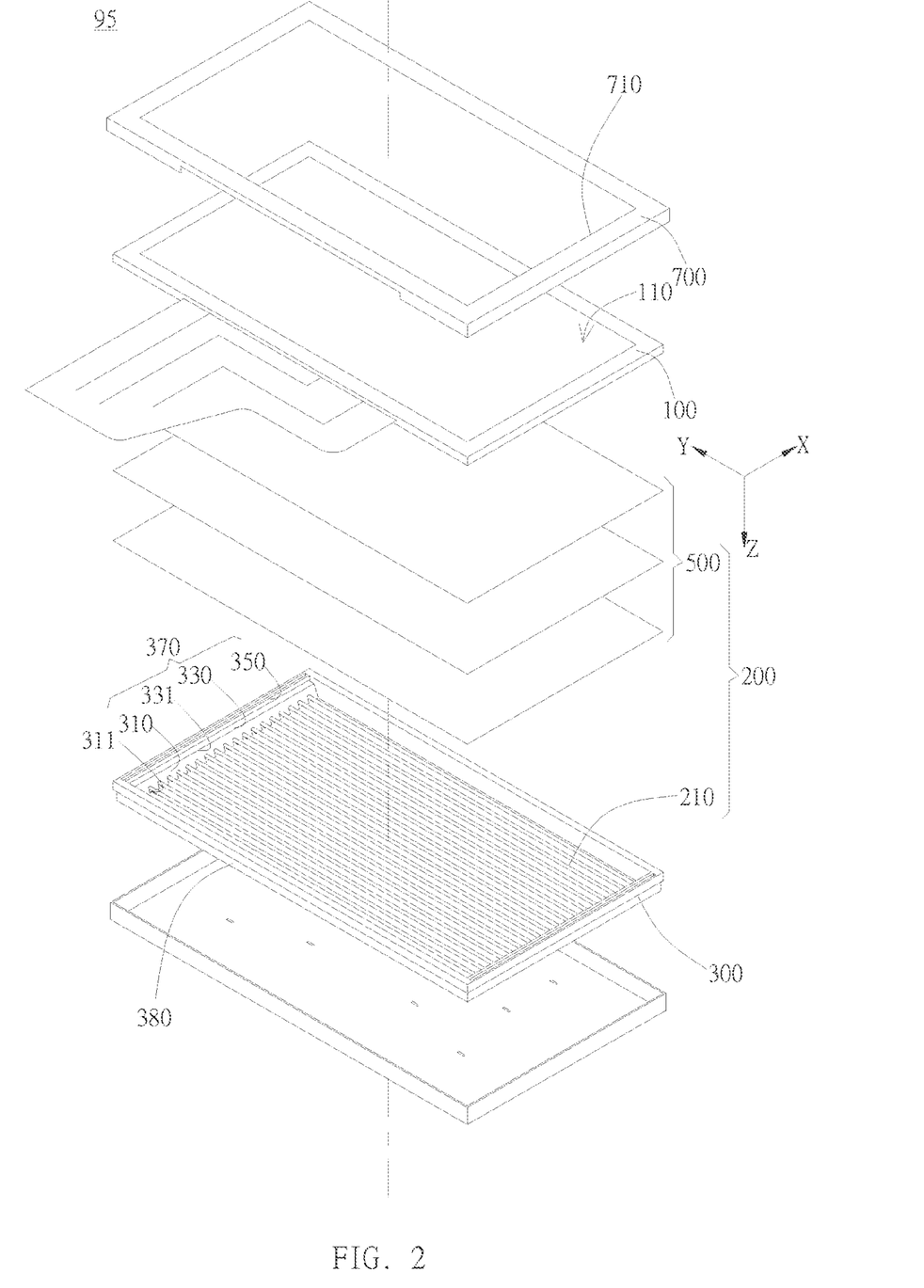
FIG. 2 shows a perspective view of an embodiment of the display device in the present invention.

With reference to FIG. 2, a display device 95 includes a display panel 100 and a backlight module 200. The display panel 100 is disposed at a light output side of the backlight module 200 and receives the light generated from the backlight module 200 to display images. The display panel 100 can be, but not limited to, a liquid crystal panel; however, in other embodiments, the display panel 100 can be any other display panel using the backlight module 200. The backlight module 200 includes a light source module 210, a light source block 300, and a film set 500. With reference to FIG. 2, the light source module 210 is composed of lamps (e.g. cold cathode fluorescent lamps); however, in other embodiments, the light source module 210 can be composed of light emitting diodes (LEDs) or other types of light sources, but not limited thereto.

With reference to FIG. 2, the light source block 300 includes a reflective surface 310, a film supporter 330, and a panel supporting surface 350. In the embodiment, the light source block 300 is integrally molded to form an integral rectangular frame including a pair of lamp holder parts 370 and a pair of linked pieces 380. The lamp holder parts 370 are opposite to each other and the linked pieces 380 are also opposite to each other for constituting the integral rectangular frame. The lamp holder parts 370 extend along a first direction defined as an X-direction, and the linked pieces 380 extend along a second direction defined as a Y-direction. The length of the linked pieces 380 is usually longer than that of the lamp holder parts 370, but not limited thereto. The light source block 300 is generally made by an injection-molding process. For such an injection-molding process, the light source block 300 is made of white material such as poly carbonate (PC) to form a white integral block. However, in other embodiments, the light source block 300 can be made by a single color injection-molding process or a dual color injection-molding process, but not limited thereto. Furthermore, in another embodiment, the light source block 300 can be formed as a single-side block and then assembled with a separate outer frame, but not limited thereto.

Figure 3:
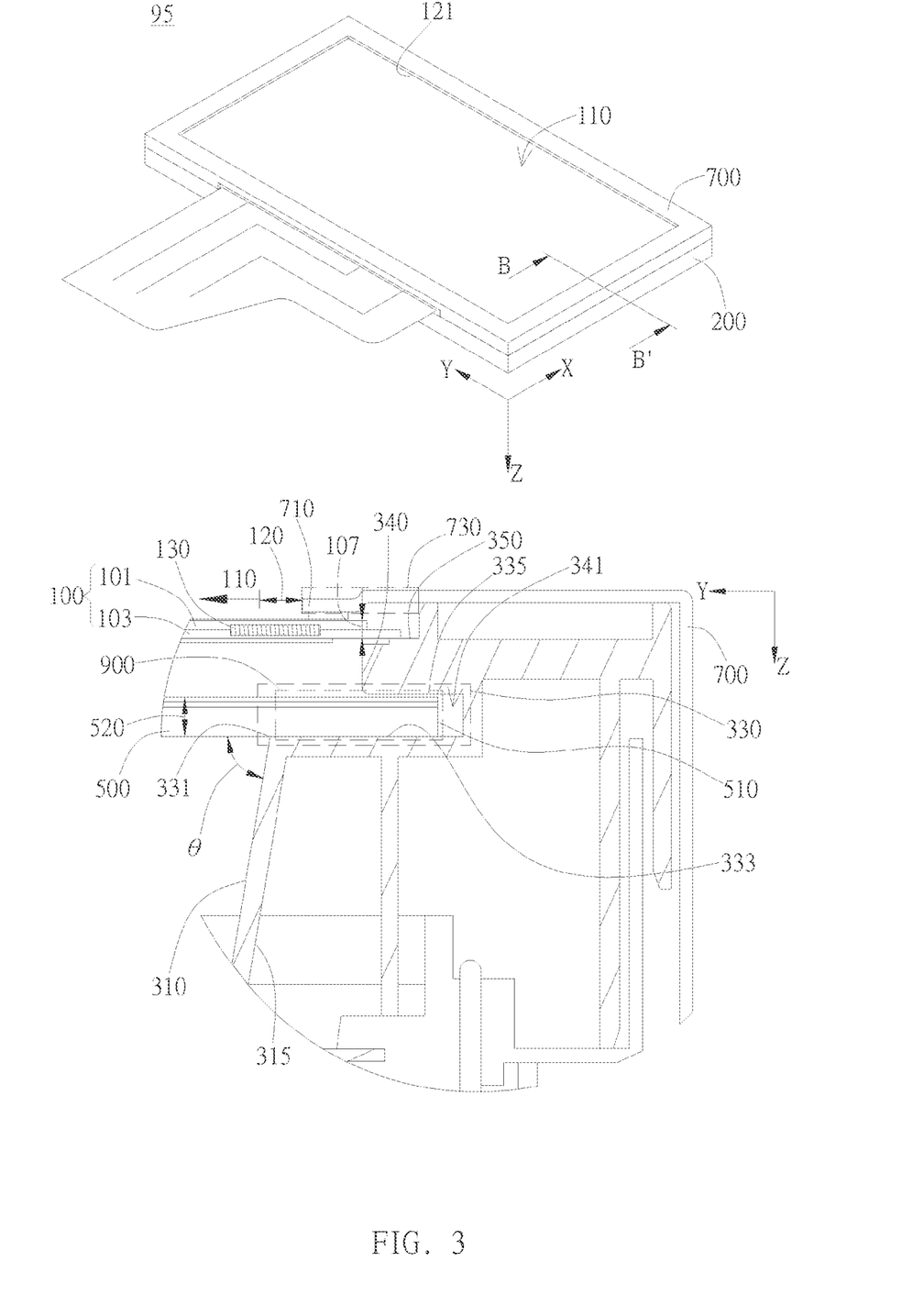
FIG. 3 shows a cross-sectional view of the embodiment shown in FIG. 2.

With reference to FIG. 2 and FIG. 3, the reflective surfaces 310 are provided at the lower portion of the lamp holder parts 370 of the light source block 300 on two opposite sides, and the reflective surfaces 310 both intersects the light source module 210 so as to reflect the light from the light source module 210. However, in other embodiments, the reflective surface 310 can be disposed around or surrounding the inner portion of the light source block 300, but not limited thereto. In the embodiment, the reflective surfaces 310 are a plurality of narrow elongated planes and respectively distributed along the extending directions (X-direction and Y-direction) of the lamp holder parts 370 and the linked pieces 380 of the light source block 300. In the embodiment shown in FIG. 2, the lower sides of the reflective surfaces 310 extend toward the light source module 210 in Z-direction, and the upper sides of the reflective surfaces 310 extend away from the light source module 210, such that the reflective surface 310s are arranged as oblique surfaces. However, in other embodiments, the reflective surfaces can be vertical surfaces with respect to the light source module 210, but not limited thereto. Besides, in the embodiment, the light source module 210 is composed of tube lamps (e.g. cold cathode fluorescent lamps). Therefore, the reflective surfaces 310 are formed with a plurality of openings 311 for the lamps inserting therethrough. In other words, the blocking surfaces 315 contrary to the reflective surfaces 310 provide a function to block the light leaking from the end of the light source module 210. The blocking surfaces 315 are normally parallel with the reflective surfaces 310 respectively, but not limited thereto.

In an embodiment, the light source block 300 is injection-molded by a single color material, especially white material such as poly carbonate (PC), or dual color materials, such as white material such as poly carbonate (PC) for the reflective surface 310 and black material such as poly carbonate (PC) and glass fiber (GF) for the body of the light source block 300. Therefore, the reflective surface 310 provides a reflective function no matter what kinds of materials the light source block 300 is made (e.g. a single color material or dual color materials). However, in another embodiment, the reflective surface 310 can be attached with reflective materials such as poly ethylene terephthalate (PET) as a reflector sheet to enhance the reflective function, but not limited thereto. Furthermore, the reflective surface 310 can also be formed with additional optical structures on the light source block 300 or changed in geometric structure of the light source block 300 to enhance the reflective function or to guide the light. In other embodiments, when the light source block 300 is made of dark materials such as poly carbonate (PC) and glass fiber (GF), a reflective material is attached to form the reflective surface 310.

With reference to FIG. 2 and FIG. 3, the film supporter 330 is formed on two opposite sides, especially on the upper portion, of the lamp holder parts 370 of the light source block 300 to correspond to the reflective surface 310. However, in another embodiment, the film supporter 330 can be formed around or surrounding the inner portion of the light source block 300, but not limited thereto. The reflective surface 310 intersects the lower extension surface 333 of the film supporter 330 at an edge 331. In other words, a side of the reflective surface 310 intersects a side of the lower extension surface 333 of the film supporter 330 to form the edge 331. Therefore, an included angle is formed between the reflective surface 310 and the lower extension surface 333 of the film supporter 330. The lower extension surface 333 of the film supporter 330 is parallel to the light source module 210 or the film set 500 so as to support a peripheral portion 900 of the film set 500. The film supporter 330 extends along the extending direction (the X-direction) of the lamp holder parts 370 of the light source block 300. In other words, in this embodiment, the extending direction of the edge 331 also extends along the same extending direction (the X-direction) of the lamp holder parts 370 of the light source block 300.

With reference to FIG. 3, the upper extension surface 335 of the film supporter 330 connects a side of an extremity surface 340, and the upper extension surface 335 is usually smaller than the lower extension surface 333 of the film supporter 330. In this case, the extremity surface 340 is entirely perpendicular, without any inclined part, to the upper extension surface 335 and the lower extension surface 333 of the film supporter 330. With reference to the cross-sectional view of FIG. 3, the film supporter 330 partially surrounds the peripheral portion 900 of the film set 500 to form an interstice 341 for receiving the peripheral portion 900 of the film set 500. The panel supporting surface 350 vertically connects the other side of the extremity surface 340 and is parallel to the upper extension surface 335 and the lower extension surface 333 of the film supporter 330. The panel supporting surface 350 is formed on two opposite sides of the light source block 300 or the lamp holder parts 370 of light source block 300 to correspond to and be disposed above the film supporter 330. However, in other embodiments, the panel supporting surface 350 can be disposed around or surrounding the inner portion of the light source block 300, but not limited thereto. Besides, the panel supporting surface 350 is parallel to the lower extension surface 333 and the upper extension surface 335 the film supporter 330 to support the edge of the display panel 100.

With reference to FIG. 2, the film set 500 is disposed above the light source module 210 for adjusting the light generated from the light source module 210. The film set 500 can include a diffusion film, a prism film or a micro-lens film, a reflective polarized film, a brightness enhancement film, or other optical films. With reference to FIG. 3, the film set 500 is disposed on the lower extension surface 333 of the film supporter 330. The film supporter 330 supports the peripheral portion 900 of the film set 500 to extend into the interstice 341 partially surrounded by the film supporter 330. The extremity surface 340 connected between the film supporter 330 and the panel supporting surface 350 is perpendicular to the film set 500. The extremity surface 340 is disposed between the edge 331 where the reflective surface 310 intersects the lower extension surface 333 of the film supporter 330 and the lateral side 510 of the film set 500. In an embodiment, the width of the interstice 341 in Z-direction is larger than the total overlapped width of the film set 500 in the same direction. The difference between the width of the interstice 341 and the overlapped width of the film set 500 in Z-direction is about 0.5 mm. Furthermore, the width of the interstice 341 is between 3 mm and 3.7 mm in Z-direction; however, the width of the interstice 341 can be adjusted in accordance with the total overlapped width of the film set 500, but not limited to this embodiment. The film supporter 330 provides a required supporting force for the film set 500 to fix the film set 500 in an appropriate position of the backlight module 200.

With reference to FIG. 2 and FIG. 3, the display panel 100 is disposed on the panel supporting surface 350. In this case, the display panel 100 is horizontally disposed above the film set 500. In other words, the film set 500 is disposed between the display panel 100 and the light source module 210. With reference to FIG. 3, the panel supporting surface 350 supports the peripheral portion 900 of the display panel 100 with a required supporting force so as to fix the display panel 100 in an appropriate position of the display device 95. In an embodiment, the overlapped width 107 that the display panel 100 stacks on the panel supporting surface 350 is between 4 mm and 5 mm. However, the overlapped width 107 can be adjusted according to the size of the display panel 100, but not limited thereto. In the embodiment shown in FIG. 3, since the edge 331 is closer to the center of the display panel 100 than the extremity surface 340 is, the overlapped width 520 provided by the lower extension surface 333 of the film supporter 330 and the film set 500 is larger than that provided by the panel supporting surface 350 and the display panel 100 in Z-direction. In this case, the overlapped width 520 between the film set 500 and the lower extension surface 333 of the film supporter 330 is larger than that between the display panel 100 and the panel supporting surface 350.

The display panel 100 includes a display area 110 and a non-display area 120 surrounding the display area 110. The light-shielding unit 130 is disposed at the non-display area 120 and adjacent to the lateral side 121 of the display area 110. In this embodiment, the light-shielding unit 130 is partially overlapped the non-display area 120 and the display area 110. The display area 110 represents the portion of the display panel 100 that displays images. For example, in the liquid crystal panel, after the light generated by the backlight module 200 enters into the display panel 100, by controlling the liquid crystal layer, images can be generated on the display area 110. With reference to FIG. 3, the light-shielding unit 130 is mostly disposed outside the display area 110 and surrounds the display area 110 to form a frame. In an embodiment, the light-shielding unit 130 includes a black frame to decrease the light transmission possibility and the light leaking phenomenon. In this case, the display panel 100 includes an upper substrate 101 and a lower substrate 103. The light-shielding unit 130 is formed between the upper substrate 101 and the lower substrate 103. In this case, the light-shielding unit 130 is formed as a black matrix made of Cr, CrOx, or Cr/CrOx (x=1.6~2.0) outside the color filter (now shown) on the inner side of the upper substrate 101. Such a black matrix is different from the black matrix formed inside the color filter which corresponds to the display area 110.

With reference to FIG. 3, viewing in X-direction and perpendicular to the display panel 100, the edge 331 where the reflective surface 310 intersects the lower extension surface 333 of the film supporter 330 falls into the vertical projection of the light-shielding unit 130. In other words, if a reference plane 339 vertically extending from the edge 331 with respect to the display panel 100, the reference plane 339 will pass through the light-shielding unit 130. In an embodiment, the edge 331 is preferably disposed at the central location of the light-shielding unit 130. In other words, the reference plane 339 vertically extending from the edge 331 with respect to the display panel 100 will pass through the central location of the light-shielding unit 130 and divided the light-shielding unit 130 into two equal portions. By such a design, the light reflected from the reflective surface 310 to the peripheral portion of the film set 500 will be decreased. When coupling with the light reflected from the film supporter 330, the light close to the light source block 300 can be uniformly distributed to prevent bright bands from occurring at the lateral side of the display panel 100.

With reference to FIG. 2 and FIG. 3, the display device 95 further includes a front frame 700 having a horizontal portion 730 disposed above and parallel to the display panel 100 and the panel supporting surface 350. In other words, the horizontal portion 730 of the front frame 700 is disposed at the display side of the display panel 100 and laterally or partially covers the panel supporting surface 350 and the display panel 100. With reference to FIG. 3, the front frame 700 surrounds and exposes the display area 110. The inner rim 710 of the front frame 700 is disposed between the edge 331 and the extremity surface 340. The horizontal portion 730 of the front frame 700 partially overlaps the light-shielding unit 130. Particularly, the projection of the inner rim 710 perpendicular to the display panel 100 is located between the projections of the edge 331 and the extremity surface 340 perpendicular to the display panel 100. That is, the inner rim 710 is disposed outside the extremity surface 340, and the inner rim 710 is more adjacent to the display area 110 than the extremity surface 340. By such a design, the panel supporting surface 350 and the extremity surface 340 is concealed within the coverage of the horizontal portion 730 of the front frame 700 to decrease the possibility of occurring bright bands. In the embodiment shown in FIG. 4, the inner rim 710 of the front frame 700 is about aligned with the extremity surface 340. In other words, the inner rim 710 can be disposed outside, inside, or just directly on the extremity surface 340. For more particularly. The distances 740 between the projections of the inner rim 710 and the extremity surface 340 is between 0 mm and 3 mm. In one of the embodiments, which the projections of the inner rim 710 are disposed outside the extremity surface 340, the projections of the inner rim 710 are preferred within the light-shielding unit 130 and do not exceed the outer edges of the light-shielding unit 130.

Figure 4:
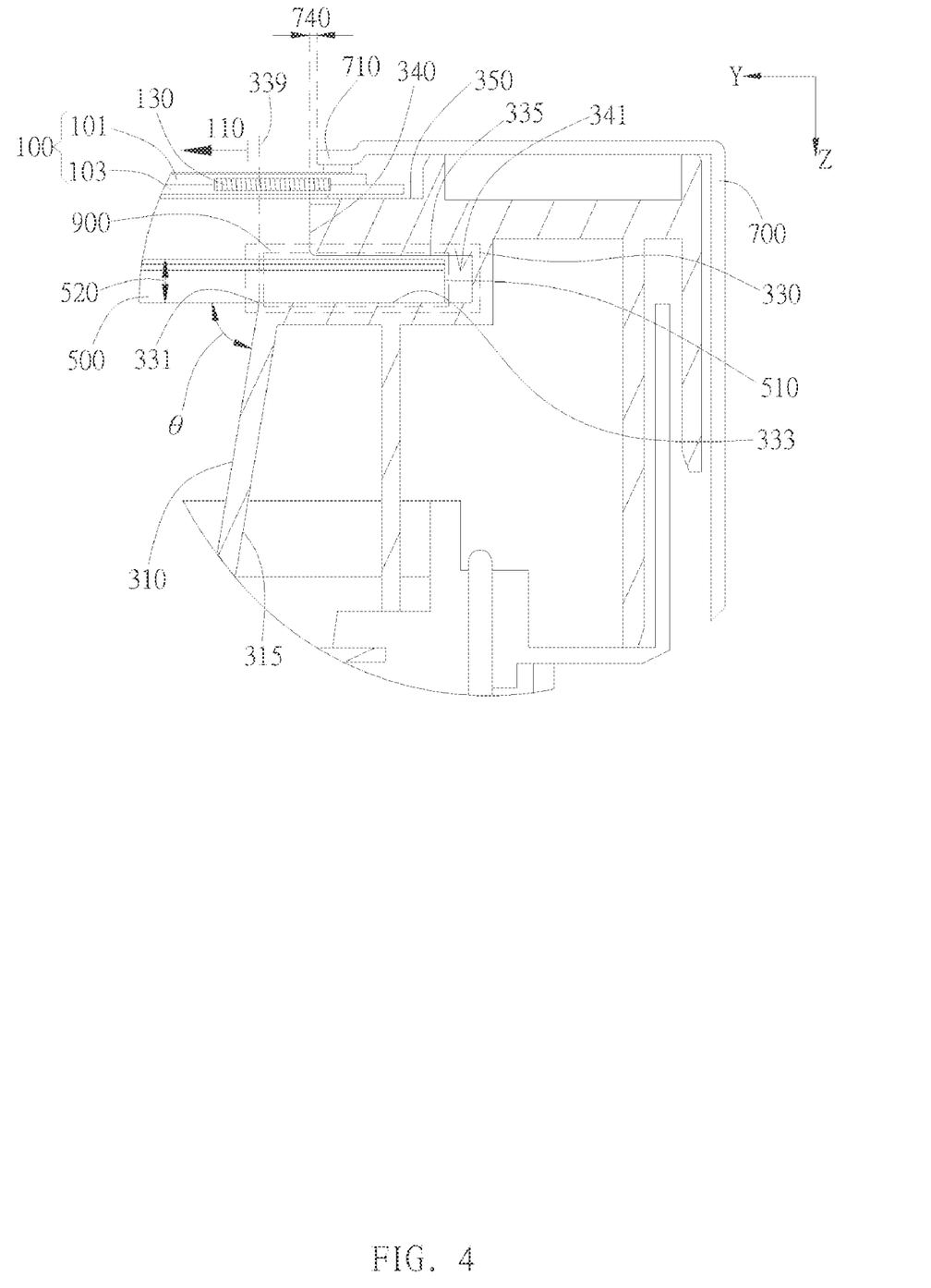
FIG. 4 shows a cross-sectional view of another embodiment of the display device in the present invention.
Figure 5:
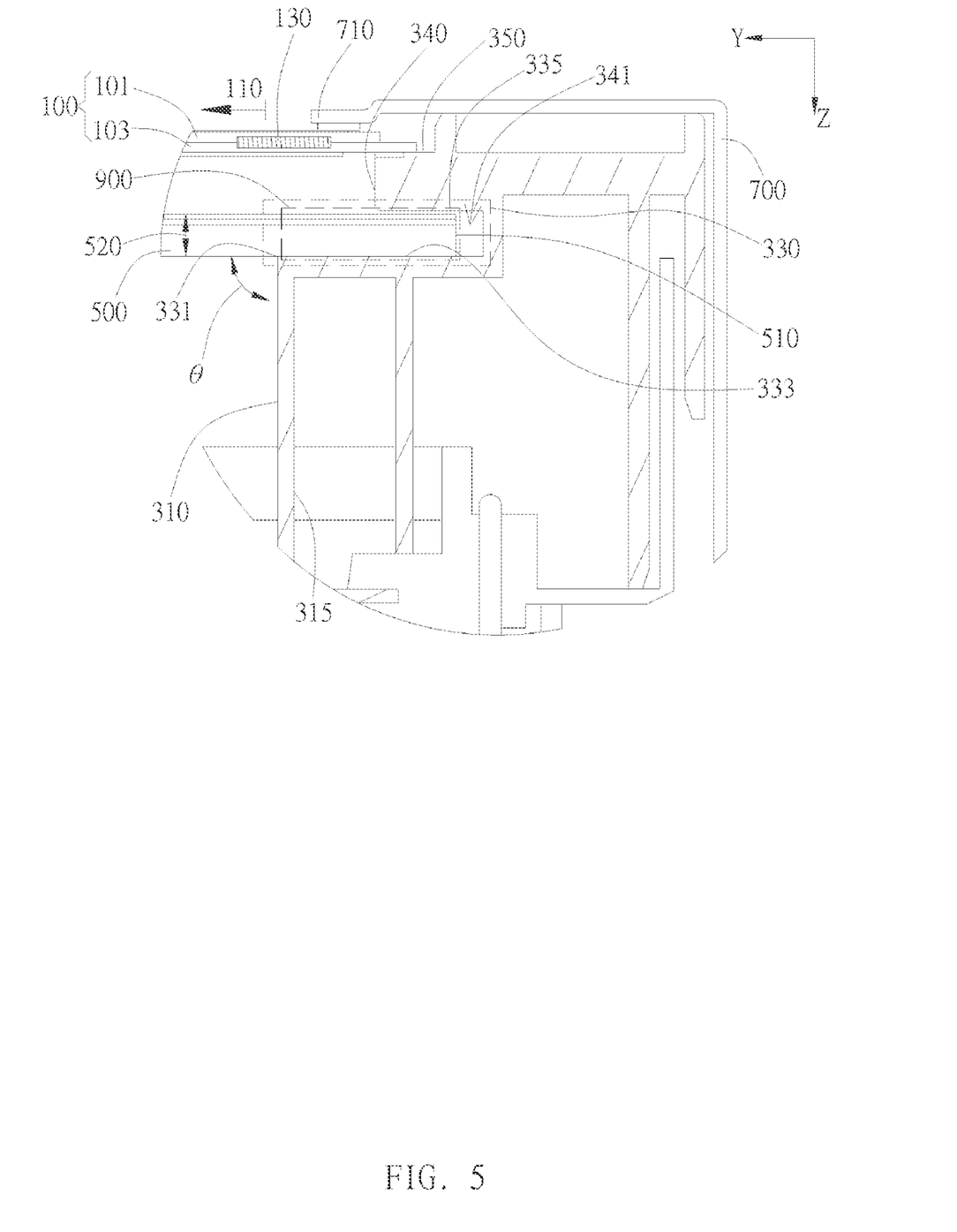
FIG. 5 shows a cross-sectional view of another embodiment of the display device in the present invention.

In the embodiments shown in FIG. 3 and FIG. 4, the reflective surface 310 is presented as an oblique structure with respect to the lower extension surface 333 of the film supporter 330 and the film set 500. An included angle θ between the reflective surface 310 and the film set 500 is between 70° and 90°. In another embodiment shown in FIG. 5, the reflective surface 310 is perpendicular to the film set 500.

Figure 6:
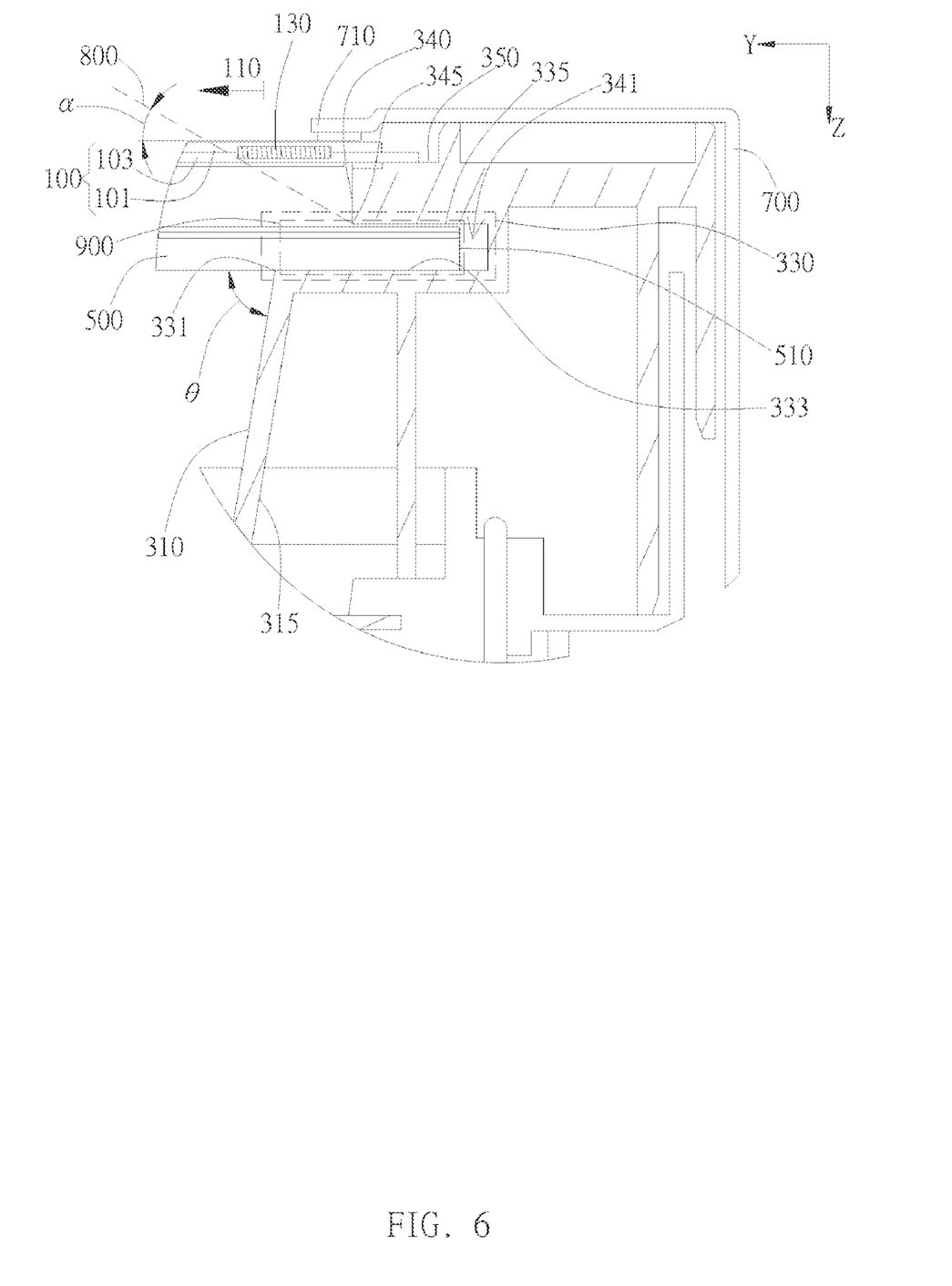
FIG. 6 shows a cross-sectional view of another embodiment of the display device in the present invention.

With reference to FIG. 6, the bottom edge 345 of the extremity surface 340 is formed with a right angle 345. If viewing from the bottom edge 345 of the extremity surface 340 extends toward the lateral side 121 of the display area 110 of the display panel 100, a virtual reference plane 800 is formed. The reference plane 800 is tangent to both the display area 110 and the extremity surface 340. An included angle α between the reference plane 800 and the display panel 100 is between 35° and 45°. This angle can be applied to the embodiments shown in FIG. 3, FIG. 4, and FIG. 5. By designing such an angle, the possibility of viewing bright bands at the lateral side of the display panel 100 can be decreased.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
a light source block including a reflective surface, a film supporter, a panel supporting surface, wherein the reflective surface intersects the film supporter at an edge, the film supporter connects the panel supporting surface at an extremity surface;
a film set disposed on the film supporter;
a display panel disposed on the panel supporting surface, the display panel including a display area and a light-shielding unit disposed outside the display area, and wherein the edge falls into a vertical projection of the light-shielding unit; and
a front frame, disposed on the display panel and the panel supporting surface, surrounding and exposing the display area, and having an inner rim;
wherein the inner rim is farther from the center of the display panel than the edge is from the center of the display panel and is located between the edge and the extremity surface.

2. The display device of claim 1, wherein the light source block is an integrally molded single color structure.

3. The display device of claim 1, wherein the light source block is a white block.

4. The display device of claim 1, wherein an included angle between the reflective surface and the film set is between 70° and 90°.

5. The display device of claim 1, wherein the extremity surface is perpendicular to the film set.

6. The display device of claim 1, wherein the extremity surface is disposed between the edge and a lateral side of the film set.

7. The display device of claim 1, wherein an included angle between the display panel and a reference plane is between 35° and 45°, and the reference plane is tangent to the extremity surface and the display area.

8. The display device of claim 1, wherein the edge corresponds to a central location of the light-shielding unit.

9. The display device of claim 1, wherein an overlapped width between the film set and the film supporter is larger than an overlapped width between the display panel and the panel supporting surface.

10. The display device of claim 1, wherein the light-shielding unit includes a black frame structure.

11. A display device, comprising:
a white block including a reflective surface, a film supporter, and a panel supporting surface, wherein the reflective surface intersects the film supporter at an edge, the film supporter connects the panel supporting surface at an extremity surface;
a film set disposed on the film supporter;
a display panel disposed on the panel supporting surface, the display panel including a display area and a light-shielding unit disposed outside the display area; and
a front frame disposed on the display panel and the panel supporting surface, having an inner rim farther from the center of the display panel than the edge is from the center of the display panel and aligned with the extremity surface, the front frame surrounds and exposes the display area, wherein an included angle between the display panel and a reference plane is between 35° and 45°, and the reference plane is tangent to the extremity surface and the display area.

12. The display device of claim 11, wherein an included angle between the reflective surface and the film set is between 70° and 90°.

13. The display device of claim 11, wherein the extremity surface is perpendicular to the film set.

14. The display device of claim 11, wherein the extremity surface is located between the edge and a lateral side of the film set.

15. The display device of claim 11, wherein the edge falls into a vertical projection of the light-shielding unit.

16. The display device of claim 15, wherein the edge corresponds to a central location of the light-shielding unit.

17. The display device of claim 11, wherein the light-shielding unit and the front frame partially overlap.

18. A display device, comprising:
a light source block including a reflective surface, a film supporter, a panel supporting surface, wherein the reflective surface intersects the film supporter at an edge, the film supporter connects the panel supporting surface at an extremity surface;
a film set disposed on the film supporter; and
a display panel disposed on the panel supporting surface, the display panel including a display area and a light-shielding unit disposed outside the display area, and wherein the edge falls into a vertical projection of the light-shielding unit and corresponds to a central location of the light-shielding unit.

19. A display device, comprising:
a white block including a reflective surface, a film supporter, and a panel supporting surface, wherein the reflective surface intersects the film supporter at an edge, the film supporter connects the panel supporting surface at an extremity surface;
a film set disposed on the film supporter;
a display panel disposed on the panel supporting surface, the display panel including a display area and a light-shielding unit disposed outside the display area, wherein the edge falls into a vertical projection of the light-shielding unit and corresponds to a central location of the light-shielding unit; and
a front frame disposed on the display panel and the panel supporting surface, the front frame surrounds and exposes the display area, wherein an included angle between the display panel and a reference plane is between 35° and 45°, and the reference plane is tangent to the extremity surface and the display area.

* * * * *